Nov. 11, 1958 — H. D. JACOBY — 2,860,008

PORTABLE IRRIGATION APPARATUS

Filed Feb. 23, 1954 — 2 Sheets-Sheet 1

INVENTOR.
HARRY D. JACOBY
BY
Buckhorn and Cheatham
ATTORNEYS

Nov. 11, 1958  H. D. JACOBY  2,860,008
PORTABLE IRRIGATION APPARATUS
Filed Feb. 23, 1954  2 Sheets-Sheet 2
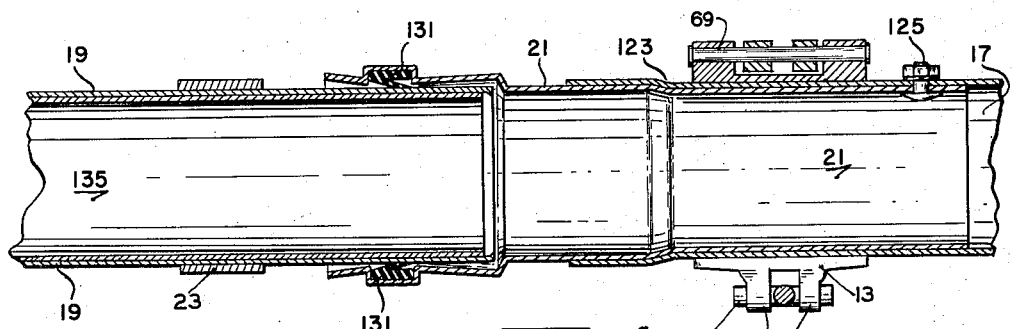
Fig. 4
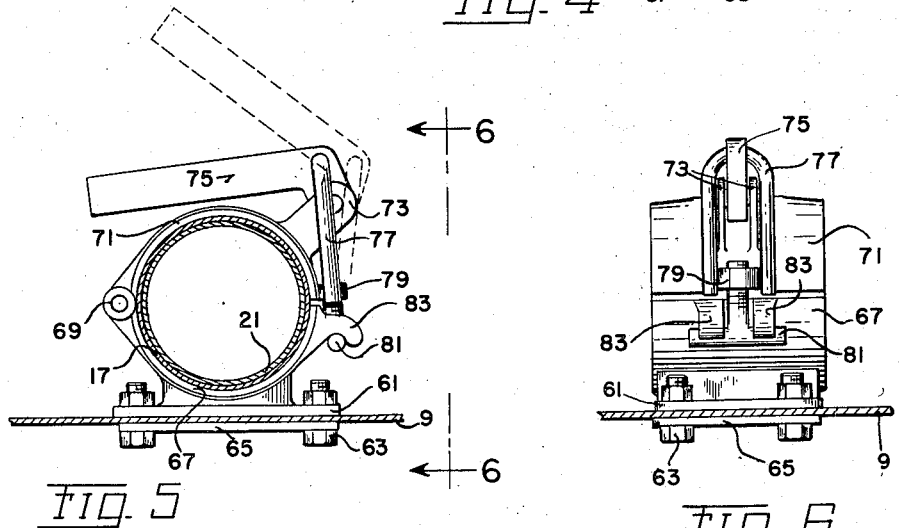
Fig. 5
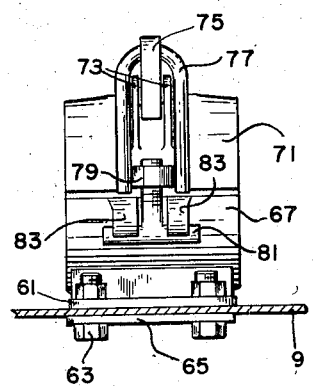
Fig. 6
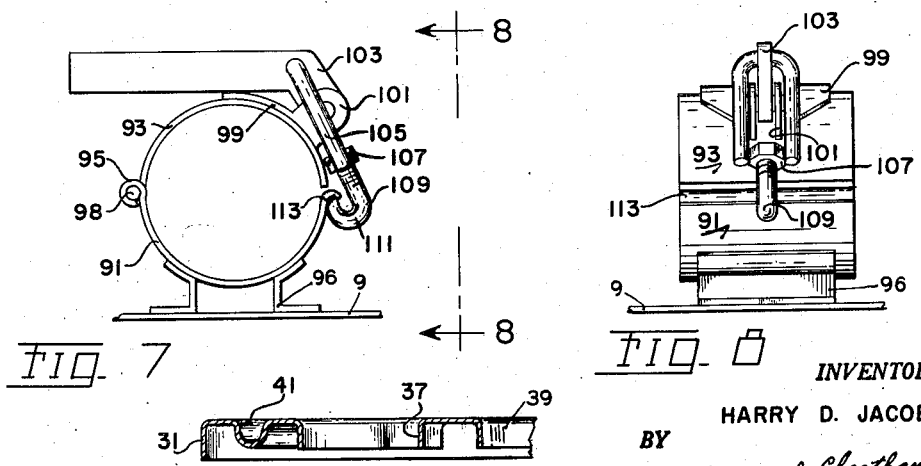
Fig. 7
Fig. 8
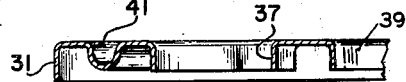
Fig. 3
INVENTOR.
HARRY D. JACOBY
BY
Buckhorn and Cheatham
ATTORNEYS United States Patent Office 2,860,008
Patented Nov. 11, 1958

2,860,008

PORTABLE IRRIGATION APPARATUS

Harry D. Jacoby, Portland, Oreg., assignor to Irrigation Equipment Co., Inc., Eugene, Oreg., a corporation of Oregon Application February 23, 1954, Serial No. 411,766

1 Claim. (Cl. 299—47)

This invention relates to improvements in portable irrigation apparatus of the type including a relatively long pipeline having spaced water outlets and being releasably clamped onto spaced wheeled dollies.

It is conventional practice to couple together the pipe sections making up the pipeline of an apparatus of the type referred to above at the dollies, and to clamp the pipe sections to the dollies with sufficient force to prevent separation of the pipeline when a pulling force is applied to the line to move the apparatus across a plot of land. As is well known to those familiar with the art, the pipe sections have relatively thin walls and thus there is considerable danger of crushing a pipe section when it is clamped onto a dolly with sufficient pressure to prevent separation of the pipe section and the dolly.

It is a main object of the present invention to provide a novel reinforcing arrangement for pipe sections to prevent their being crushed when clamped onto the dollies. More particularly, it is an object of the present invention to provide tubular liners within the adjacent ends of a pair of pipe sections to reinforce the pipe sections against collapse, and further to provide such an arrangement wherein one or both of the liners may constitute part of the coupling arrangement between the adjacent ends of a pair of pipe sections.

Another object of the present invention is to provide a novel, quick clamp device for clamping a pipe section onto a dolly frame to thus facilitate rapid assembling and disassembling of portable irrigation apparatus.

A more specific object of the present invention is to provide a quick clamp device including two hinged pipe embracing members, one having a lever pivoted thereon, there being a toggle keeper member formed to detachably engage the other member and being pivoted on the lever in spaced relation to the pivotal axis of the lever in a manner so that it will move over center of the pivotal axis of the lever when the lever is swung from its inoperable to its operable position.

A further object of the present invention is to provide a quick clamp device of the type described above designed for ready fabrication from sheet metal parts and also to provide such a clamp device ideally suited for being formed from cast parts.

Heretofore, a dolly for irrigation apparatus of the type generally referred to above has included a fabricated, generally quadrangular frame, which is most frequently constructed of angle sections or similar pieces suitably welded or bolted together and supported at two opposite corners thereof by a pair of wheels. Another object of the present invention is to provide a dolly which is less expensive and stronger yet lighter in weight than previous dollies, by having as a substitute for the above described frame a pressed or stamped sheet metal frame of novel construction. The sheet metal frame comprises in general a substantially flat single sheet metal piece reinforced against flexure by a novel arrangement of flanges and ribs formed from portions of the sheet metal piece.

Various other objects of the present invention will be apparent from the following description taken in connection with the accompanying drawings wherein:

Fig. 3 is a fragmentary, enlarged sectional view taken along line 3—3 of Fig. 2;

Fig. 4 is an enlarged sectional view taken along line 4—4 of Fig. 1, showing the construction of the reinforcing sleeves;

Fig. 5 is an enlarged sectional view taken along line 5—5 of Fig. 1, showing the construction of the quick clamp device;

Fig. 6 is a view taken in the direction of the arrows 6—6 of Fig. 5, further showing the construction of the quick clamp device;

Fig. 7 is a view similar to Fig. 5 but showing a modified form of the quick clamp device;

Fig. 8 is a view taken in the direction of the arrows 8—8 in Fig. 7;

Figure 1:
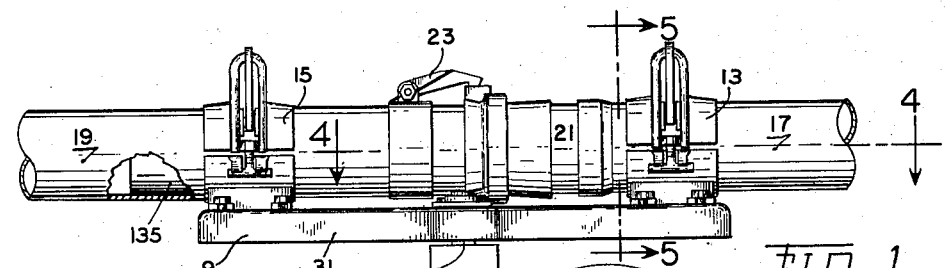
Fig. 1 is a side elevational view of a part of a portable irrigation apparatus embodying the concepts of the present invention.
Figure 2:
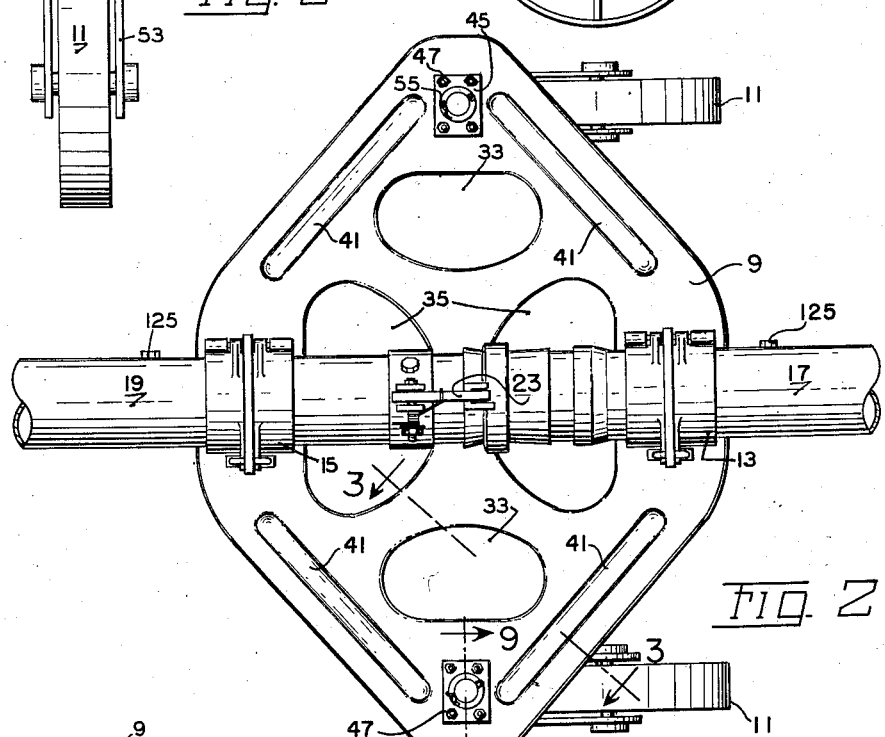
Fig. 2 is a plan view of the arrangement disclosed in Fig. 1.

Referring to the accompanying drawings wherein similar reference characters designate similar parts throughout, Figs. 1 and 2 disclose generally a dolly frame 9 supported by a pair of wheels 11 and carrying a pair of spaced clamping devices 13 and 15, which are clamped respectively around pipe sections 17 and 19. Reinforcing liner 21 fits within and protrudes from the end of pipe section 17 and is formed to provide a female fitting receiving the end of pipe section 19. A coupling device 23 of conventional construction couples liner 21 to pipe section 19.

Considered more particularly, it is evident from the drawings that frame 9 comprises a single generally diamond-shaped sheet metal piece having rounded corners, the side margins of said piece being bent downwardly to provide a reinforcing flange 31 around the periphery of the frame. Formed in the sheet metal piece are a plurality of openings 33 and 35, four being shown, defined by flanges 37 and 39, respectively (compare Figs. 2 and 3). Flanges 37 and 39 are bent from marginal portions initially defining smaller openings in the sheet metal piece. The sheet metal piece is also provided with a plurality of elongated recesses or depressions, four being shown, arranged adjacent and extending parallel to the sides of the frame and providing reinforcing ribs 41. The openings 33 and 35 are distributed on the frame 9 so that they overlap one another in the direction of extension of the pipe sections 17 and 19. Thus the reinforcing flanges 37 and 39 provide continuous reinforcement throughout the central portion of the frame and yet the size of the openings is maintained relatively small so as not to impair the strength of the frame. Since the central portion of the frame is subjected to the greatest bending stresses, this construction effectively reinforces the frame against flexure and yet the frame is relatively light. It is further pointed out that the openings are disposed inwardly of the ribs 41 so as not to weaken the margins of the frame. However, the ribs 41 extend beyond the openings 35 in either direction away from the center of the frame 9 parallel to the pipes 17 and 19 so that although the openings 35 are disposed in spaced relation to the corners of the frame most adjacent thereto, the reinforcement provided by the flanges 37 and 39 is continued by the end portions of the ribs 41.

Figure 9:
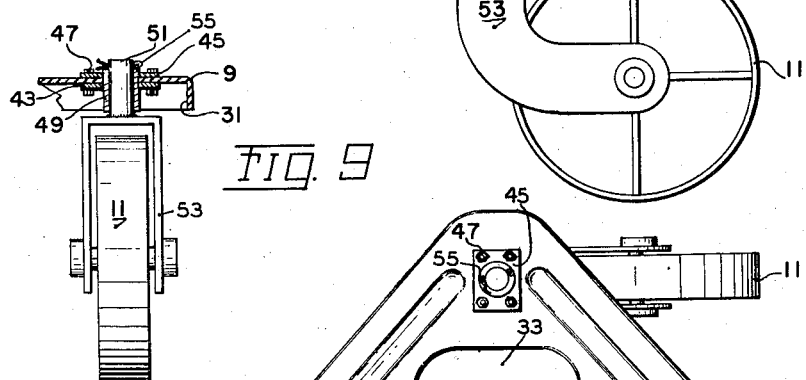
Fig. 9 is a sectional view taken along 9—9 of Fig. 2, showing the manner of mounting a caster wheel on the dolly frame.

Wheels 11, previously mentioned, are mounted in the following fashion. Disposed on the underside of frame 9 adjacent each of the two most remote corners thereof, is a reinforcing plate 43 (see Fig. 9), and disposed in register therewith on the opposite side of the frame is a reinforcing plate 45. Each lower plate and the associated upper plate are secured together by nuts and bolts 47, the bolts extending through the frame. Secured to and extending through each pair of plates is a sleeve bearing 49 swivelly receiving the stem 51 of caster forks 53, on the lower ends of which a wheel 11 is rotatably mounted. A cotter pin 55 retains the stem within bearing 49.

Figure 10:
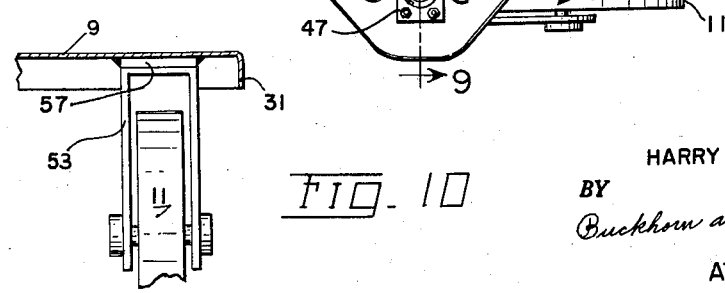
Fig. 10 is a view similar to Fig. 9, showing the manner of mounting a fixed fork wheel on the dolly frame.

Reference is made to Fig. 10 to show the manner of mounting a fixed fork on a frame. The fixed fork is secured at its upper end to a reinforcing plate 57, which is welded to the underside of the frame.

Referring to Figs. 5 and 6, it is apparent that each clamp device includes a base 61 clamped by nuts and bolts 63 to frame 9, said bolts extending through the frame and through a reinforcing plate 65 arranged beneath the frame. Base 61 has formed integrally therewith a semicylindrical portion 67 adapted to support the associated pipe section. Hinged at 69 to portion 67 is a semicylindrical member 71 pivotally carrying by means of a pair of ears 73 a bell crank shaped lever 75. Pivotally mounted at the bend in the lever is a toggle keeper comprising a U-shaped member 77, a nut 79 and a T-shaped keeper bolt 81. The curved portion of the U-shaped member 77 is pivoted in the lever, and the nut 79 is secured, such as by welding, to and between the ends of the U-shaped member. Threadedly received by the nut is the shank of the T-shaped bolt 81. The head of bolt 81 is adapted to be arranged behind a pair of curved lugs 83 formed on semicylindrical portion 67.

When lever 75 is swung from its inoperable broken line position in Fig. 5 to the full line position there shown, the pivotal axis of the toggle keeper moves over center relative to the pivotal axis of the lever and thus the toggle keeper has a toggle action which retains it in its operable position against accidental movement therefrom. The T-shaped bolt 81 is initially longitudinally adjusted by threading it in or out of nut 79 so that when the lever is swung as above indicated, the semicylindrical portions of the clamp device will firmly clamp the associated pipe section therebetween with the desired clamping pressure.

A modified clamp device is shown in Figs. 7 and 8. There the clamp device includes two sheet metal semicylindrical members 91 and 93 having interdigitated portions bent to form knuckles 95. A hinge pin 98 extends through the knuckles. Semicylindrical member 91 is adapted to be secured by a pair of base elements 96 to the dolly frame. Secured to member 93 is a curved sheet metal piece 99, having outwardly bent ears 101 on which is mounted at one end thereof a bell crank shaped lever 103. Pivotally mounted on the lever at the bend thereof is a toggle keeper. The toggle keeper includes a U-shaped element 105 pivoted at the curved portion thereof on the lever and having secured between its ends nuts 107 threadedly receiving a keeper hook 109. The keeper hook has a reversely curved end 111 hooked into a reversely curved tab 113 formed on the lower semicylindrical member 91.

It is apparent that the second form of quick clamp device is essentially similar to that of the first form, the difference between the two forms of quick clamp devices being that the second one is designed to be fabricated from sheet metal pieces.

Referring particularly to Fig. 4, the arrangement for reinforcing pipe sections 17 and 19 in the clamping zones thereof is best shown. Liner 21, previously mentioned, has a snug fit within the end of pipe section 17, both pipe section 17 and liner 21 preferably being formed with cooperating bell portions at 123. It is apparent that liner 21 extends through the clamping zone of pipe section 17. In order to prevent longitudinal slipping between pipe section 17 and liner 21, a bolt and nut 125 are provided. Liner 21 is formed with a female fitting on the end thereof protruding from pipe section 17. Received within this end is the plain end of pipe section 19, suitable gaskets or seals 131 of conventional construction being provided to prevent leakage of water between the ends of liner 21 and pipe section 19. Closely fitting within pipe section 19 is a reinforcing liner 135 extending through the clamping zone thereof and serving to prevent the pipe section from being crushed. A nut and bolt 125 also secures liner 135 against longitudinal movement relative to pipe section 19.

Secured to the opposed portions of liner 21 and pipe section 19 is coupling 23, previously mentioned. Conventionally, the pipe sections are formed from aluminum tubing and it is the preferable form of construction to form the liners 21 and 135 of steel to provide a maximum resistance against crushing of the walls of the aluminum tubing.

The advantages of the irrigation apparatus of the present invention are as follows. The steel liners of the irrigation apparatus of the present invention permit considerable clamping pressure to be applied to the aluminum tubing sections by the clamping devices without danger of crushing the tubing, yet, this construction does not materially add to the weight of the irrigation apparatus nor does it materially obstruct the flow of water through such apparatus. With such greater clamping pressure the operator pulling such irrigation apparatus may move a longer pipeline of the apparatus with less caution and thus with greater speed than has heretofore been possible.

The steel liners also permit the use of various clamp devices now on the market without danger of crushing the tubing, although the quick clamp device disclosed in the present application has marked advantages over conventional clamp devices. It is also pointed out that the liners may constitute extensions of one or both of two pipe sections and thus the female coupler fitting may be formed on the liner instead of on the pipe section. This means that substantially all pipe sections may be made interchangeable instead of having two separate types or kinds of pipe sections.

It is pointed out that the clamps have considerable axial length and that the liners not only extend through the clamping zones of the clamps but extend considerable distances in both directions beyond the clamps. It is apparent from the drawings that the axial length of the clamps is not less than substantially the diameter of the associated pipe sections. By the above construction flexing of the pipe sections is constrained to occur at places outwardly of the clamps to thus maintain a fixed coaxial disposition of the telescoped end portions of the pipe sections. Thus the gasket 131 is able to provide an efficient seal between the telescoped ends of the pipe sections and is not damaged by being crushed between the end portions, which might occur if such end portions were allowed to become substantially misaligned when the pipe sections were flexed, such as when rounding curves. It is further pointed out that because the liners within the pipe sections extend in both directions beyond the clamps the amount of flexure of the pipe sections occurring at the outer axial edges of the clamps is reduced over that which would occur were it not for the extending portions of the liners. This arrangement prevents the thin walled pipe sections from being crushed by excessive flexing against the outer axial edges of the clamps. It will be appreciated that flexing of the pipe sections occurs almost entirely in the unlined portions of the pipe sections outwardly of the clamps.

By providing long clamps, greater force can be applied to the pipe sections, without danger of crushing the pipe sections, to thus preclude longitudinal slipping movement of the pipe sections when an end load is applied to the pipeline of the irrigation apparatus. This end load is therefore transmitted from one pipe section to its clamp, from the clamp to the associated dolly sheet metal frame, from the frame to the other clamp, and from the other clamp to the associated pipe section. It will be appreciated, therefore, that the coupling or latch 23 is relieved of all endwise loads.

The latch 23 functions only to enable the pipe sections to be coupled together with the sprinkler nozzles thereof, not shown, in longitudinal alignment. Thus when the pipe sections are clamped onto the dollies, all the sprinkler nozzles may be readily arranged in upright positions in longitudinal alignment. Furthermore, when it is desired to use a string of pipe sections as a ground line, the couplings or latches 23 may be employed to retain the pipe sections in connecting relationship and with their sprinkler nozzles in longitudinal vertical alignment.

The conventional clamp device requires the removal or loosening of a number of bolts for installing or removing pipe. This means that wrenches or similar tools must be handy in order to install or remove pipe. This is not only inconvenient but the time involved in such an operation is considerably more than is involved in operating the quick clamp devices of the present invention. It is evident that a quick clamp device involving the concepts of the present invention may be opened by swinging its lever to its inoperable position. Thus, with an irrigation apparatus employing quick clamp device of the present invention, the length of the pipeline may be quickly lengthened or shortened as desired. Such quick assembling or disassembling of the line also facilitates the ready transportation of the irrigation apparatus to other locations.

The novel dolly frame of the portable irrigation apparatus of the present invention is considerably lighter in weight than comparable previous fabricated frames and yet the sheet metal frame of the present invention is as strong or stronger than previous frames and thus is capable of withstanding the forces applied thereto, particularly when moving the apparatus from one place to another. Furthermore, the pressed or stamped frame permits shipping the frames unassembled, since unskilled labor can then be used to bolt the wheel forks and quick clamp device onto the frame proper. Fabricated frames have to be shipped in completed, or substantially completed, condition because otherwise skilled labor would be required to complete the fabrication by welding. It is further pointed out that the stamped or pressed frame of the present invention has a minimum number of exposed sharp edges or corners in comparison to the conventional angle iron fabricated frame and thus is safer for personnel operating the apparatus.

Having described the invention in what is considered to be a preferred embodiment thereof, it is desired that it be understood that the specific details shown are merely illustrative and that the invention may be carried out in other ways.

I claim:

An irrigation apparatus of the class described, comprising a pair of coaxially arranged thin walled pipe sections having adjacent end portions, said pipe sections being of the same diameter, one pipe section having a liner extending into the mentioned end thereof and projecting therefrom, the projecting end portion of said liner telescopically receiving the mentioned end portion of the other pipe section, a gasket between the telescoped end portions of said liner and other pipe section providing a liquid tight seal therebetween, a wheeled dolly supporting said pipe sections at said telescoped end portions, a pair of spaced coaxially arranged clamps fixed to the dolly and being disposed axially outwardly of said telescoped end portions and being rigidly clamped about the pipe sections to prevent longitudinal slipping of the pipe sections relative to the dolly under the influence of an end load, and a reinforcing liner fitting snugly within said other pipe section, said liners extending coextensively with the associated clamps, operable to prevent collapse of the thin walls of the pipe sections against the pressure of the clamps, each liner extending in both directions axially beyond the associated clamp to be operable to resist flexure of the associated pipe section at the clamp to thus decrease the amount of flexure thereof occurring at the outer axial edges of the clamp to preclude crushing of the thin walls of the pipe section on such edges during lateral flexing of the pipe section.

References Cited in the file of this patent

UNITED STATES PATENTS

| | | |
|---|---|---|
| 627,987 | Dick | July 4, 1899 |
| 749,782 | Forbes | Jan. 19, 1904 |
| 815,558 | Rosier | Mar. 20, 1906 |
| 1,290,590 | Lehew | Jan. 7, 1919 |
| 1,765,985 | McHaffie | June 24, 1930 |
| 2,375,338 | Alexander | May 8, 1945 |
| 2,652,282 | Willetts | Sept. 15, 1953 |
| 2,741,510 | McCulloch | Apr. 10, 1956 |
| 2,742,319 | Tobin | Apr. 17, 1956 |